(12) United States Patent
Hasegawa et al.

(10) Patent No.: US 10,498,196 B2
(45) Date of Patent: Dec. 3, 2019

(54) VEHICLE ROTATING ELECTRICAL MACHINE

(71) Applicant: Mitsubishi Electric Corporation, Tokyo (JP)

(72) Inventors: Kazuya Hasegawa, Tokyo (JP); Takuya Ishida, Tokyo (JP); Yoshihiro Shinosaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 251 days.

(21) Appl. No.: 15/255,282

(22) Filed: Sep. 2, 2016

(65) Prior Publication Data

US 2017/0317556 A1    Nov. 2, 2017

(30) Foreign Application Priority Data

Apr. 28, 2016 (JP) .................................. 2016-090223

(51) Int. Cl.
*H02K 5/10* (2006.01)
*H02K 5/20* (2006.01)
*H02K 9/06* (2006.01)

(52) U.S. Cl.
CPC ................. *H02K 9/06* (2013.01); *H02K 5/10* (2013.01); *H02K 5/20* (2013.01)

(58) Field of Classification Search
CPC .. H02K 5/20; H02K 9/06; H02K 5/10; H02K 9/00; H02K 9/02; H02K 9/04

(Continued)

(56) References Cited

U.S. PATENT DOCUMENTS 5,194,770 A * 3/1993 Yoshioka ................. H02K 9/06
                                                                    310/51
5,686,773 A   11/1997 Sakakibara et al.
(Continued)

FOREIGN PATENT DOCUMENTS

DE     19549204 A1 *  7/1997  ............... H02K 5/20
JP     10290551 A     10/1998
(Continued)

OTHER PUBLICATIONS

Schreiber, Machine Translation of DE19549204, Jul. 1997.*
(Continued)

*Primary Examiner* — Michael Andrews
*Assistant Examiner* — Eric Johnson
(74) *Attorney, Agent, or Firm* — Sughrue Mion, PLLC; Richard C. Turner (57) ABSTRACT

A vehicle rotating electrical machine has a rotor, a stator, a cooling fan provided in an axial direction end portion of the rotor and rotated integrally with the rotor, a housing, having an air intake provided opposing the cooling fan in an axial direction end portion, an annular rib provided adjacent to the air intake, and a discharge port provided across the annular rib, that houses the rotor and the stator and rotatably supports a rotary shaft, and a stay provided on a radial direction outer periphery of the housing, wherein the annular rib has an inner diameter side inclined cylindrical face, which inclines so that a diameter thereof becomes gradually smaller toward an inner side of the housing from an axial direction outer side end face of the air intake, and a sealing portion is provided between the stay and the annular rib.

10 Claims, 9 Drawing Sheets

(58) Field of Classification Search
USPC .............................. 310/60 R, 62, 63, 89, 417
See application file for complete search history.

(56) References Cited

U.S. PATENT DOCUMENTS

| 6,417,585 B1 * | 7/2002 | Oohashi | H02K 5/20 |
| | | | 310/428 |
| 2014/0354092 A1 * | 12/2014 | Hasegawa | H02K 9/06 |
| | | | 310/63 |

FOREIGN PATENT DOCUMENTS

| JP | 2924689 B2 | 7/1999 | | |
| JP | 2015-159723 A | 9/2015 | | |
| WO | WO 2008037294 A1 * | 4/2008 | ............... | H02K 5/20 |

OTHER PUBLICATIONS

Braun, Machine Translation of WO2008037294, Apr. 2008.*
Communication dated Mar. 21, 2017, from the Japanese Patent Office in counterpart application No. 2016-090223.

* cited by examiner

VEHICLE ROTATING ELECTRICAL MACHINE

BACKGROUND OF THE INVENTION

Field of the Invention

The present invention relates to a vehicle rotating electrical machine, and for example, relates to a rotating electrical machine mounted in a vehicle or the like and having a cooling fan rotated integrally with a rotor.

Description of the Related Art

There is an existing vehicle alternating current generator that generates cooling air using a cooling fan rotated integrally with a rotor in order to cool coil ends of a multiple of stator coils disposed on a radial direction outer side of a rotor. This kind of existing vehicle alternating current generator is such that a structure wherein a recess portion is provided in a housing opposing the coil ends of the stator coils in an axial direction has been proposed in order to improve the cooling performance of the coil ends by the cooling air from the cooling fan. In this way, the existing vehicle alternating current generator is such that, by a recess portion being provided in the housing, the width of a cooling air channel formed between the coil ends and the housing can be increased, whereby an improvement in the coil end cooling performance can be achieved (for example, refer to Patent Document 1).

Meanwhile, there is an existing generator such that the connection strength between a generator frame and amount stay (stay portion) is increased, vibration of a rotor, stator, or the like is prevented from increasing, and rotational fluctuation of the rotor is prevented. This kind of existing generator is such that a stay portion having a supported portion provided on an outer periphery of a cylindrical portion of a frame includes a connection member that extends from an inner side portion of the supported portion toward an outer peripheral side of the cylindrical portion, thereby connecting the stay portion and frame. Also, the connection member has an inclined face inclined with respect to a face perpendicular to an axis of rotation (for example, refer to Patent Document 2).

[Patent Document 1] JP-A-2015-159723
[Patent Document 2] Japanese Patent No. 2,924,689

However, in recent years there is a strengthening trend for demands with respect to vehicle rotating electrical machines (vehicle alternating current generators) to increase; demands for, of course, an increase in cooling performance, and at the same time, demands for restricting vibration and rotational fluctuation. With regard to a mount stay (stay portion) assembled in an engine, a frame-side end portion of the connection member blocks the greater part of a radial direction outer side of an exhaust port on the outer periphery of the frame cylindrical portion when the kind of strengthening using an inclined face described in Patent Document 2 is employed.

When an intermediate frame portion, between which and a blade of the fan disclosed in Patent Document 1 there is a narrow gap, and a channel expanded in an axial direction continuing from an outer diameter side inclination of the intermediate frame portion are applied in response to an exhaust port whose radial direction outer side is partially blocked as heretofore described, the following problems occur. Firstly, when the direction of cooling air fed into the housing from an air intake changes to a radial direction in order to pass along the channel formed between the coil ends and the front side housing, the cooling air is biased considerably from the axial direction to the axial center. Then, suctioned air that flows around and is drawn further inside the vehicle rotating electrical machine than the intermediate frame portion, which protrudes into the housing, is deflected and discharged, as a result of which a problem occurs in that the air nears the air intake and is suctioned again. The occurrence of this problem is particularly noticeable when the air intake is opened to a large size adjacent to an exhaust port whose radial direction outer side is blocked, that is, when the kind of thin spoke shown in FIG. 2 of Patent Document 1 is not configured. Re-suctioning of air that has once been drawn inside the vehicle rotating electrical machine is certain to cause a reduction in cooling performance.

SUMMARY OF THE INVENTION

The invention, having been contrived in order to resolve the heretofore described kinds of problem, has an object of providing a vehicle rotating electrical machine such that improvements in vibration resistance and strength are achieved, and a reduction in the cooling performance of a fan is restricted.

A vehicle rotating electrical machine according to the invention includes a rotor rotated with a rotary shaft as a center, a stator disposed opposing so as to enclose an outer periphery of the rotor, a cooling fan provided in an axial direction end portion of the rotor and rotated integrally with the rotor, a housing, having an air intake provided opposing the cooling fan in an axial direction end portion, an annular rib provided adjacent to the air intake, and a discharge port provided across the annular rib, that houses the rotor and the stator and rotatably supports the rotary shaft, and a stay provided on a radial direction outer periphery of the housing, wherein the annular rib has an inner diameter side inclined cylindrical face, which inclines so that a diameter thereof becomes gradually smaller toward an inner side of the housing from an axial direction outer side end face of the air intake, and a sealing portion is provided between the stay and the annular rib.

According to the vehicle rotating electrical machine according to the invention, unneeded re-suction air flow, occurring due to stay reinforcement and an increase in the width of a cooling air channel, can be restricted. Because of this, vibration from an engine can be dispersed over the whole of a housing, concentration in a stay leg portion is eliminated, and stress distortion is reduced, whereby housing deformation can be prevented. Also, together with this, a flow of cooling air generated by rotation of a cooling fan is secured by reducing a gap between blades of the cooling fan and the housing, and channel width can be increased without causing a reduction in cooling performance.

The foregoing and other objects, features, aspects and advantages of the invention will become more apparent from the following detailed description of the present invention when taken in conjunction with the accompanying drawings.

DETAILED DESCRIPTION OF THE PREFERRED EMBODIMENTS

First Embodiment

Hereafter, based on the drawings, a description will be given of a first embodiment of the invention. The same reference signs in each drawing indicate identical or corresponding portions.

Figure 1:
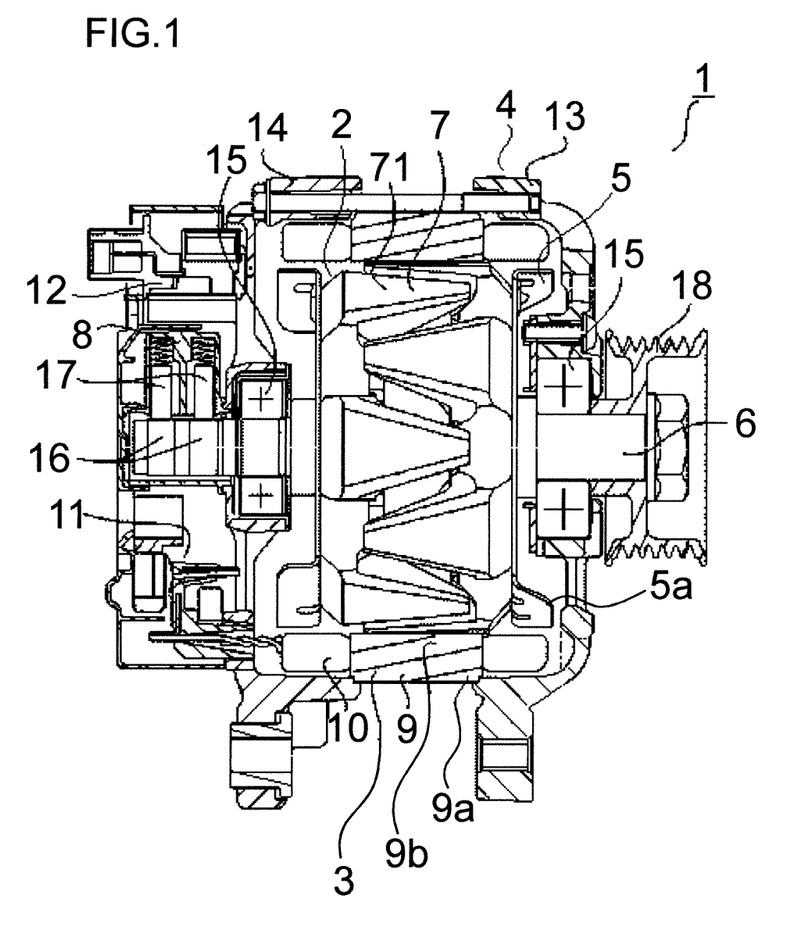
FIG. 1 is a sectional view showing a vehicle rotating electrical machine (vehicle alternating current generator) according to a first embodiment of the invention.

FIG. 1 is a sectional view showing a vehicle rotating electrical machine (vehicle alternating current generator) according to the first embodiment of the invention. In FIG. 1, a vehicle rotating electrical machine (vehicle alternating current generator) 1 has a rotor 2 rotated with an axial line as a center, a cylindrical stator 3, disposed in a position on a radial direction outer side of the rotor 2, that encloses an outer periphery of the rotor 2, a housing 4 that supports the rotor 2 and stator 3, and a cooling fan 5, provided on the rotor 2, that generates cooling air by being rotated integrally with the rotor 2.

The rotor 2 has a rotary shaft 6 disposed on the axial line of the rotor 2, and a rotor main body 7, provided on the rotary shaft 6 and housed in the housing 4. The rotor main body 7, in order to carry out a supply of electricity to the rotor 2, has a field coil (not shown) that generates magnetic flux by being supplied with current from a brush device 8 mounted on the rotary shaft 6, and pole cores, on which the field coil is provided, wherein a magnetic pole is formed by the magnetic flux generated by the field coil.

The stator 3 is fixed inside the housing 4. Also, the stator 3 has a cylindrical (annular) stator core 9 that encloses the rotor main body 7, and a multiple of stator coils 10, provided on the stator core 9, wherein alternating current electromotive force is generated by the magnetic flux from the field coil (not shown) varying with rotation of the rotor 2. A rectifier 11, which rectifies alternating current generated in the stator 3 to direct current, a voltage regulator 12, which regulates the magnitude of alternating current voltage generated in the stator 3, and the like are provided on a rear side exterior of the housing 4.

The stator core 9 is configured of a magnetic body of, for example, iron. In the first embodiment, the stator core 9 is configured of a multiple of magnetic bodies stacked in an axial direction of the rotor 2.

Figure 2A:
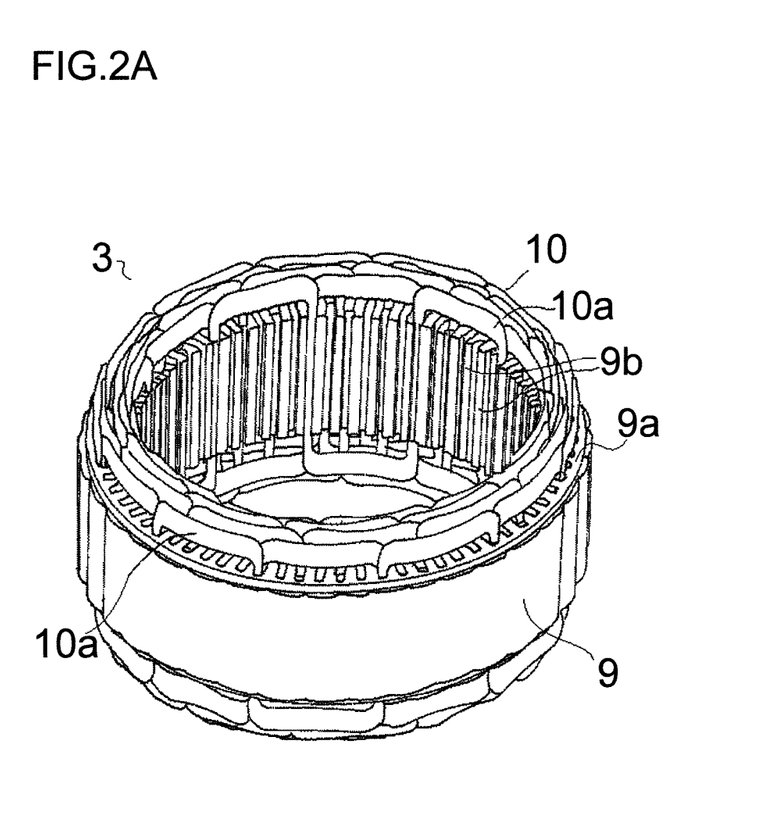
FIG. 2A is a perspective view of a stator of the vehicle rotating electrical machine shown in FIG. 1.
Figure 2B:
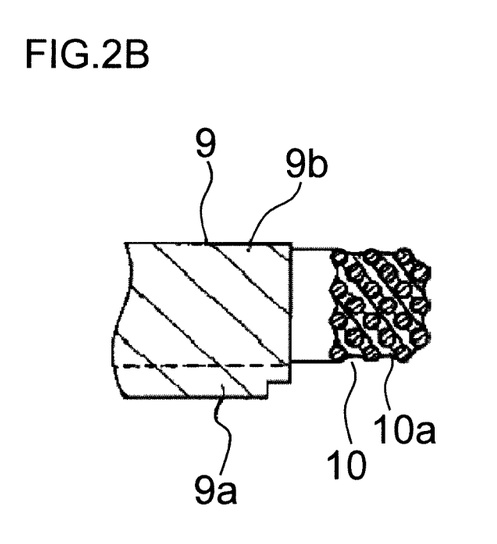
FIG. 2B is a partial enlarged sectional view of the stator of the vehicle alternating current generator shown in FIG. 1.

FIG. 2A is a perspective view of the stator of the vehicle rotating electrical machine (vehicle alternating current generator) shown in FIG. 1. Also, FIG. 2B is a partial enlarged sectional view of the stator of the vehicle alternating current generator shown in FIG. 1. As shown in FIGS. 2A and 2B, the stator core 9 has a circular back yoke portion 9a, and a multiple of magnetic pole tooth portions 9b, each protruding inward in a radial direction from the back yoke portion 9a, disposed at intervals from each other in a peripheral direction of the stator core 9. The magnetic pole tooth portions 9b are disposed at equal intervals in the peripheral direction of the stator core 9.

The stator coil 10 is provided on each magnetic pole tooth portion 9b. Also, the multiple of stator coils 10 are aligned in the peripheral direction of the stator core 9. In the first embodiment of the invention, each stator coil 10 is provided across a multiple of the magnetic pole tooth portions 9b, and stator coils 10 adjacent to each other in the peripheral direction are disposed overlapping in the radial direction. Each stator coil 10 has a coil end 10a protruding from an end face of the stator core 9 (an axial direction end face of the stator core 9) in the axial direction of the rotor 2.

The whole of an apex portion (axial end) of each coil end 10a reaches a position on the radial direction outer side of the cooling fan 5. Although the dimension in the axial direction of the coil end 10a is not the same for every coil configuring the coil ends 10a, the coil ends 10a as a whole form a practical block form, as shown in FIG. 2B. Because of this, the position of the apex portion of each coil end 10a with respect to the axial direction end face of the stator core 9 is practically the same in the peripheral direction in the axial direction of the rotor 2.

The housing 4 is configured of a front side housing 13 and a rear side housing 14, each of which is made of aluminum in an approximate bowl shape. The front side housing 13 and rear side housing 14 are fixed to each other by a multiple of bolts (not shown) in a state wherein aperture portions thereof are opposing. Each of the front side housing 13 and rear side housing 14 opposes the rotor 2 and stator 3 in the axial direction of the rotor 2. In the first embodiment of the invention, each of the front side housing 13 and rear side housing 14 is molded by casting, such as sand mold casting or aluminum die casting.

The rotary shaft 6 passes through the center of each of the front side housing 13 and rear side housing 14. Also, the rotary shaft 6 is rotatably supported by each of the front side housing 13 and rear side housing 14 through a bearing 15.

The cooling fan 5 is fixed to a side face on either side in the axial direction of the rotor main body 7. Consequently, the cooling fan 5 fixed to one side face of the rotor main body 7 is covered by the front side housing 13, and the cooling fan 5 fixed to the other side face of the rotor main body 7 is covered by the rear side housing 14. Also, the cooling fan 5 has a multiple of blades 5a disposed at intervals from each other in a direction of rotation of the cooling fan 5. Each blade 5a is disposed in an outer peripheral portion of the cooling fan 5.

The brush device 8 has a pair of slip rings 16 fixed to a rear side portion of the rotary shaft 6, and a pair of brushes 17, provided inside the housing 4, that individually come into contact with one each of the slip rings 16. When the rotary shaft 6 is rotating, the slip rings 16 rotate centered on the axial line of the rotary shaft 6 while sliding against the brushes 17.

A pulley 18, around which a transmission belt (not shown) for transmitting power is wound, is fixed to an end portion of the rotary shaft 6 protruding to the outside of the housing 4 from the front side housing 13.

Figure 3:
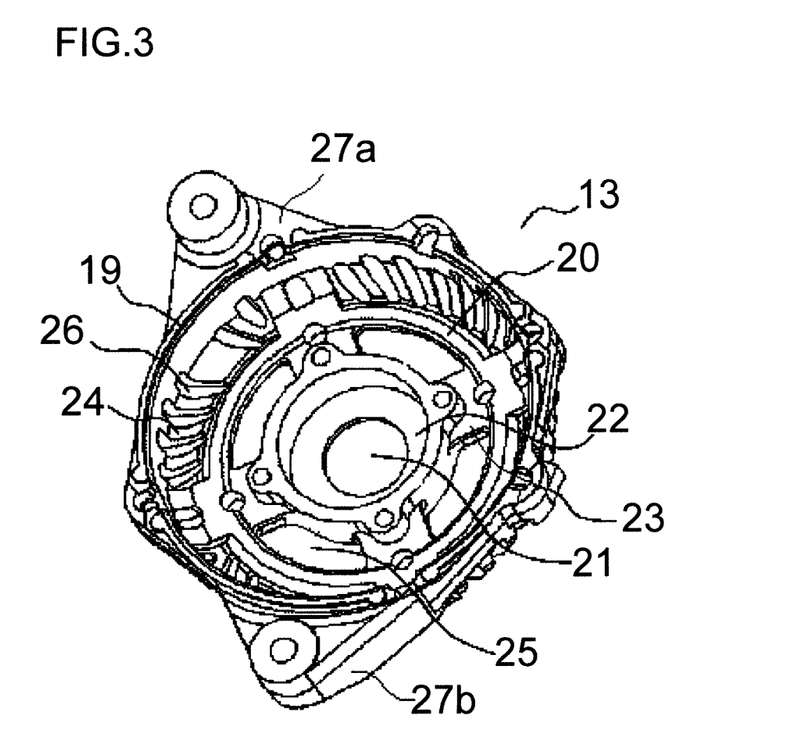
FIG. 3 is a perspective view of a front side housing of the vehicle rotating electrical machine shown in FIG. 1 when seen from an inner side.
Figure 4A:
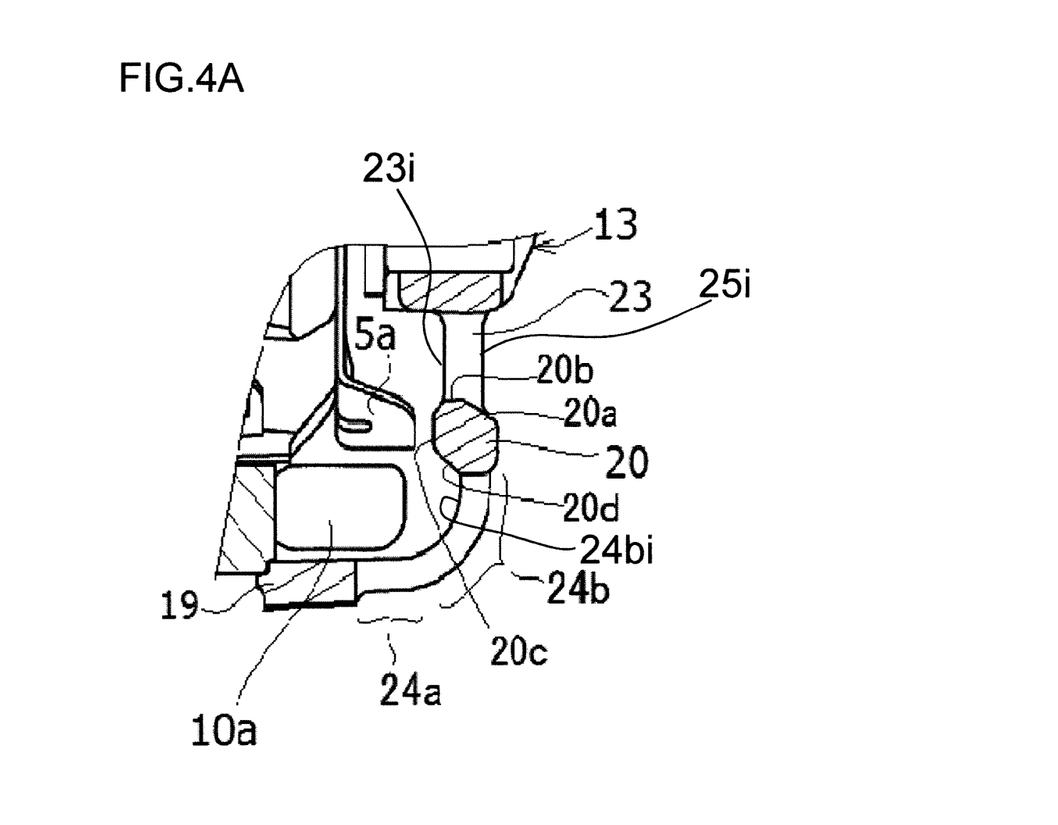
FIG. 4A is a sectional schematic view showing a cooling fan and a non-stay portion of the front side housing of the vehicle rotating electrical machine shown in FIG. 1.

FIG. 3 is a perspective view of the front side housing of the vehicle rotating electrical machine (vehicle alternating current generator) shown in FIG. 1 when seen from the inside. Also, FIG. 4A is a sectional schematic view showing the cooling fan and a non-stay portion of the front side housing of the vehicle rotating electrical machine (vehicle alternating current generator) shown in FIG. 1. Furthermore, FIG. 4B is a sectional view that illustrates air flow using FIG. 4A.

Figure 4B:
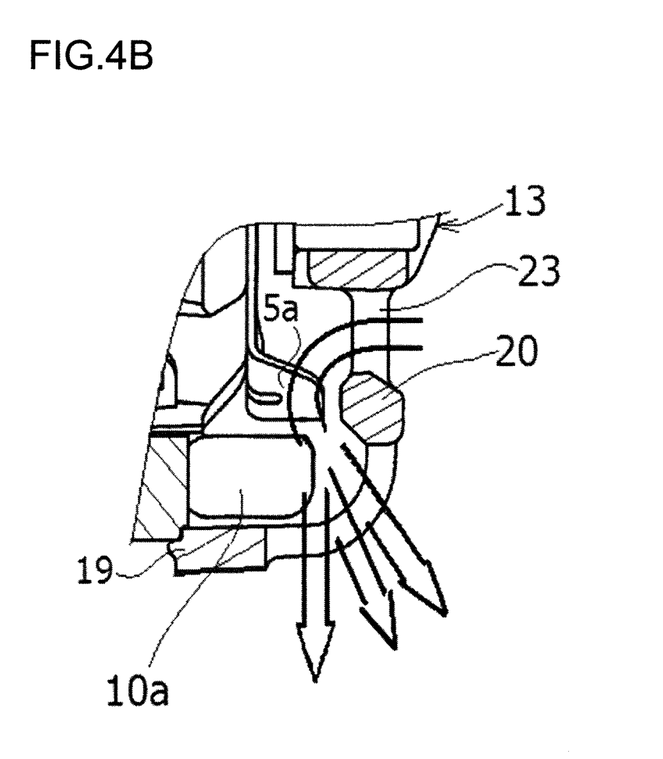
FIG. 4B is a sectional view that illustrates air flow using FIG. 4A.

In FIGS. 3, 4A, and 4B, the front side housing 13 has an annular outer frame portion 19 disposed coaxially with the rotor 2, an annular intermediate frame portion 20 (annular rib), disposed coaxially with the outer frame portion 19 and disposed in a position away from the rotor main body 7 than the outer frame portion 19 in the axial direction of the rotor 2, a boss portion 22, in which is provided a through hole 21 through which the rotary shaft 6 is passed, disposed in a position to the inner side of the intermediate frame portion 20, a multiple of spokes 23 linking the intermediate frame portion 20 and boss portion 22, and a multiple of ribs 24 linking the outer frame portion 19 and intermediate frame portion 20. A stepped portion on which the stator core 9 is fitted is provided in an inner peripheral portion of the outer frame portion 19.

The spokes 23 are disposed in a position opposing the rotor main body 7 in the axial direction of the rotor 2. Also, the spokes 23 are disposed in the radial direction of the front side housing 13, and disposed at intervals from each other in the peripheral direction of the front side housing 13.

The spokes 23 are configured to support the boss portion 22, which is a bearing boss. Because of this, elliptical air intakes 25, wide in the peripheral direction and separated by the spokes 23, are formed to a quantity the same as that of the spokes 23 in positions between the intermediate frame portion 20 and boss portion 22 in the front side housing 13.

The ribs 24 are disposed in positions further to the radial direction outer side than the cooling fan 5. Also, the ribs 24 are disposed at intervals from each other in the peripheral direction of the front side housing 13. Because of this, a multiple of exhaust ports 26, separated by the ribs 24, are formed in positions between the outer frame portion 19 and intermediate frame portion 20 in the front side housing 13.

In the first embodiment of the invention, each rib 24 has a rib axial direction portion 24a, disposed along the coil end 10a from the outer frame portion 19 in a position on the radial direction outer side of the coil end 10a, and a rib radial direction portion 24b, which passes along the axial direction outer side of the coil end 10a to reach the intermediate frame portion 20 while curving from an end portion of the rib axial direction portion 24a. Because of this, each exhaust port 26 is a slit-form hole reaching a position nearer than the coil end 10a to the rotary shaft 6 from a position on the radial direction outer side of the coil end 10a.

A gap in the front side housing 13 between a face opposing the blade 5a of the cooling fan 5 (a fan-opposing face) and the blade 5a of the cooling fan 5 is narrower than a gap between another portion of the cooling fan 5 and the front side housing 13 in order to secure a flow amount of cooling air generated by rotation of the cooling fan 5. In the first embodiment of the invention, the intermediate frame portion 20 is disposed opposing the blade 5a of the cooling fan 5 in the axial direction of the rotor 2, as shown in FIGS. 4A and 4B.

As shown by arrows indicating the flow of cooling air in FIG. 4B, cooling air generated by rotation of the cooling fan 5 is fed from the outside of the housing 4 through the air inlets 25 to the inside of the housing 4. Cooling air fed through the air inlets 25 to the inside of the housing 4 flows to the radial direction outer side of the front side housing 13 inside the housing 4 and, after passing along a channel formed between the coil end 10a and the front side housing 13, is discharged to the outside of the housing 4 through the discharge ports 26. When passing along the channel formed between the coil end 10a and the front side housing 13, the cooling air carries out an exchange of heat with the coil end 10a. The coil end 10a is cooled by the exchange of heat with the cooling air.

As shown in FIG. 4A, the intermediate frame portion (annular rib) 20 has an inner diameter side inclined cylindrical face 20a, which inclines so that a diameter thereof becomes gradually smaller moving toward the inner side of the vehicle rotating electrical machine 1 from an axial direction outer side end face 25i of the air intake 25 (from the right side to the left side of FIG. 4A). Also, the intermediate frame portion (annular rib) 20 includes, in order from a terminal portion of the inner diameter side inclined cylindrical face 20a, an inner diameter side cylindrical face 20b parallel with the axial direction of the rotary shaft 6, a circular face 20c opposing a leading end portion of the blade 5a of the cooling fan 5, which has a face perpendicular to the axial direction, and an outer diameter side inclined cylindrical face 20d, which inclines so that a diameter thereof becomes gradually larger from a terminal portion of the circular face 20c toward the outer side of the vehicle rotating electrical machine 1 (from the left side to the right side of FIG. 4A), that is, toward the outer side of the housing 4.

Also, an axial direction position of the circular face 20c is configured to protrude further to the inner side of the vehicle rotating electrical machine 1 than either an axial direction inner end 23i of the spoke 23, which regulates the air intake 25, or an axial direction inner end 24bi of the rib radial direction portion 24b that regulates the radial direction of the discharge port 26. In this way, a cooling channel is regulated by the circular face 20c being formed protruding to the cooling fan 5 side, and furthermore, by the circular face 20c opposing the leading end portion of the blade 5a of the cooling fan 5, which has a face perpendicular to the axial direction.

By the intermediate frame portion 20 inclining at the axial direction outer side end face 25i of the air intake 25, forming the inner diameter side inclined cylindrical face 20a, cooling air is drawn into the inner side of the vehicle rotating electrical machine 1 in a direction biased to the axial center, and subsequently, by the intermediate frame portion 20 inclining to form the outer diameter side inclined cylindrical face 20d, the cooling air is discharged to the outside of the vehicle rotating electrical machine 1 in a direction away from the axial center.

Figure 5:
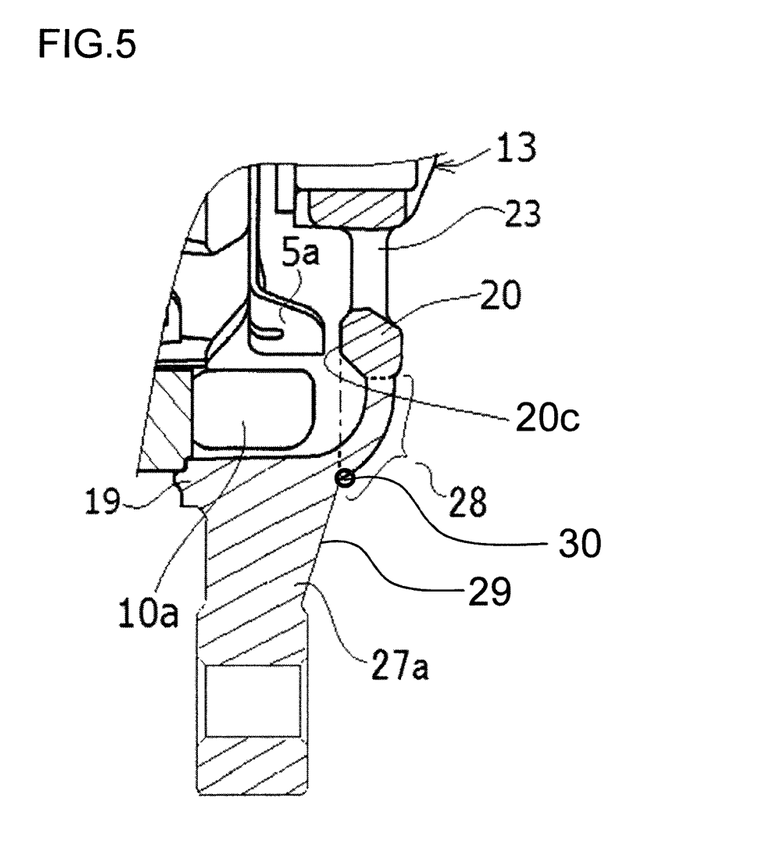
FIG. 5 is a sectional schematic view showing the cooling fan and a stay portion of the front side housing of the vehicle rotating electrical machine shown in FIG. 1.
Figure 6:
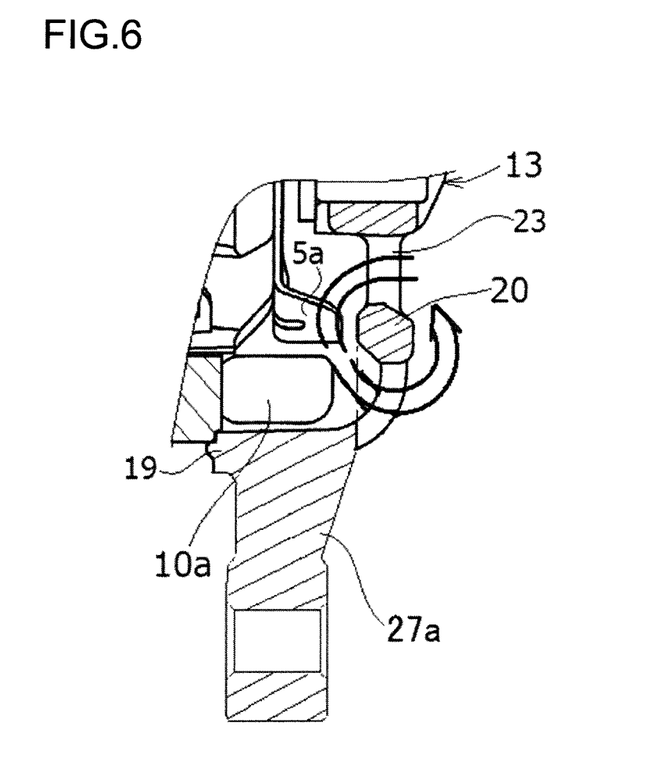
FIG. 6 is a sectional schematic view for illustrating a problem conceivable when a sealing portion is not provided in FIG. 5.

Also, FIG. 5 is a sectional schematic view showing the cooling fan and a stay portion of the front side housing of the vehicle rotating electrical machine (vehicle alternating current generator) shown in FIG. 1. FIG. 6 is a sectional schematic view for illustrating a problem conceivable when a sealing portion is not provided in FIG. 5.

As shown in FIGS. 3 and 5, stays 27a and 27b, which provide support to an engine, are provided in one portion in the peripheral direction in the front side housing 13. As shown in FIG. 5, a side end portion inclined face 29 is provided over practically the same range as the rib axial direction portion 24a. An axial direction position of an intersection point 30 thereof (a point at which the side end portion inclined face 29 of the stay 27a and the outer frame portion 19 of the housing 4 intersect) is the same position as that of the circular face 20c of the intermediate frame portion 20, or to the outer side thereof (the right side in FIG. 5).

In particular, when an outer diameter side (a side opposing the stay) of the intermediate frame portion 20 is biased by the outer diameter side inclined cylindrical face 20d, there is a possibility of a kind of circulating flow shown in FIG. 6 becoming liable to occur. Further, there is a possibility of air being led to the inner diameter side inclined cylindrical face 20a on the inner diameter side of the intermediate frame portion 20, and easily being suctioned into the vehicle rotating electrical machine 1 again.

In the first embodiment of the invention, as shown in FIG. 5, there is a further advantage in that re-suction of cooling air can be prevented by a sealing portion 28 being provided between the stay 27a and the intermediate frame portion 20, and cooling performance is not worsened. Also, even in a state in which the sealing portion 28 is provided, air flow inside the vehicle rotating electrical machine 1 is such that the suctioning state from the large apertures of air intakes 25 adjacent to the inner diameter side remains as it is, and there is no effect on the flow magnitude.

Figure 7:
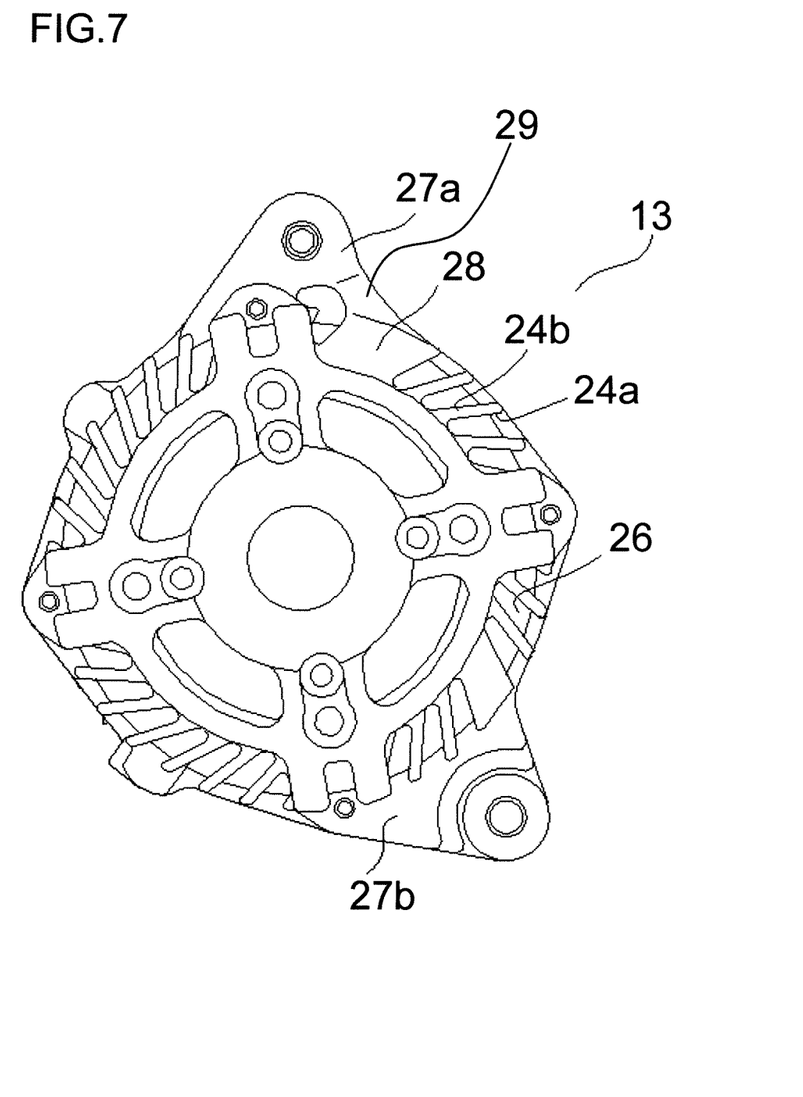
FIG. 7 is a plan view of the front side housing of the vehicle rotating electrical machine shown in FIG. 1 when seen from an outer side.

Also, FIG. 7 is a plan view of the front side housing of the vehicle rotating electrical machine shown in FIG. 1 when seen from the outer side. In FIG. 7, the sealing portion 28 is provided between the stay 27a and intermediate frame portion 20. Also, the side end portion inclined face 29 is provided in a connection portion of the outer frame portion 19 and stay 27a of the front side housing 13. Further still, the sealing portion 28 is provided between the connection portion and an outermost periphery of the intermediate frame portion 20.

The invention as illustrated in the first embodiment is one example thereof, and the number of stator slots, the number of rotor magnetic poles, the form and number of stays, and the like, can be selected as appropriate.

Also, in the first embodiment, the invention is applied to a vehicle alternating current generator, but the first embodiment of the invention may also be applied to a generator-motor that is a rotating machine.

It will be apparent to those skilled in the art that various modifications and alterations of the invention can be made without departing from the scope and spirit of the invention, and it should be understood that this is not limited to the illustrative embodiment set forth herein.

What is claimed is:

1. A vehicle rotating electrical machine, comprising:
a rotor rotated with a rotary shaft as a center;
a stator disposed opposing the rotor so as to enclose an outer periphery of the rotor;
a cooling fan provided in an axial direction end portion of the rotor and rotated integrally with the rotor;
a housing, having an air intake provided opposing the cooling fan in an axial direction end portion, an annular rib provided adjacent to the air intake, and a discharge port provided across the annular rib, that houses the rotor and the stator and rotatably supports the rotary shaft; and
a stay provided on an outer periphery of the housing in a radial direction of the vehicle rotating electrical machine, wherein
the annular rib has an inner diameter side inclined cylindrical face, which inclines so that a diameter thereof becomes gradually smaller toward an inner side of the housing from an axial direction outer side end face of the air intake, and
a sealing portion is provided between the stay and the annular rib,
wherein the housing has an outer frame portion, provided further than the discharge port to an outer peripheral side, and a side end portion inclined face in a connection portion of the outer frame portion and stay,
wherein the side end portion inclined face connects with the sealing portion at an intersection point.

2. The vehicle rotating electrical machine according to claim 1, wherein
the annular rib is formed protruding further to the cooling fan side than an axial direction inner end of the air intake and a radially innermost portion of an axial direction inner end of the discharge port in a radial direction of the vehicle rotating electrical machine.

3. The vehicle rotating electrical machine according to claim 1, wherein
the annular rib has, in order from a terminal portion of the inner diameter side inclined cylindrical face, an inner diameter side cylindrical face parallel with the axial direction, a circular face opposing a leading end portion of a blade of the cooling fan, which has a face perpendicular to the axial direction, and an outer diameter side inclined cylindrical face, which inclines so that a diameter thereof becomes gradually larger from a terminal portion of the circular face toward an outer side of the housing.

4. The vehicle rotating electrical machine according to claim 3, wherein
the intersection point of the side end portion inclined face and the sealing portion is configured in the same axial direction position as that of the circular face of the annular rib, or to the outer side of an axial direction position of the circular face, and
the sealing portion is provided between the connection portion and an outermost diameter of the annular rib.

5. The vehicle rotating electrical machine according to claim 1, wherein
the intersection point of the side end portion inclined face and the sealing portion is configured in the same axial direction position as that of a circular face of the annular rib provided on an inner side of the annular rib in an axial direction of the vehicle rotating electrical machine, or to the outer side of an axial direction position of the circular face of the annular rib, and
the sealing portion is provided between the connection portion and an outermost diameter of the annular rib.

6. The vehicle rotating electrical machine according to claim 5, wherein
an angle of inclination of the side end portion inclined face with respect to the radial direction at the intersection point is different from an angle of inclination of the sealing portion with respect to the radial direction at the intersection point.

7. The vehicle rotating electrical machine according to claim 6, wherein
the intersection point of the side end portion inclined face and the sealing portion is configured in the same axial direction position as that of the circular face of the annular rib.

8. The vehicle rotating electrical machine according to claim 5, wherein
the intersection point of the side end portion inclined face and the sealing portion is configured in the same axial direction position as that of the circular face of the annular rib.

9. The vehicle rotating electrical machine according to claim 1, wherein the side end portion inclined face is provided on an outer axial end of the housing and is inclined with respect to the radial direction.

10. The vehicle rotating electrical machine according to claim 1, further comprising a discharge port rib that links the annular rib to the outer frame portion of the housing, wherein the intersection point of the side end portion inclined face and the sealing portion is positioned to an outer side of an axial direction position of an axial direction portion of the discharge port rib.

* * * * *